(12) United States Patent
Kim et al.

(10) Patent No.: US 7,757,249 B2
(45) Date of Patent: Jul. 13, 2010

(54) EMERGENCY ALERT SIGNALING METHOD AND DIGITAL TELEVISION RECEIVER

(75) Inventors: Jin Pil Kim, Seoul (KR); Chang Sik Yun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 281 days.

(21) Appl. No.: 11/545,761

(22) Filed: Oct. 11, 2006

(65) Prior Publication Data
US 2007/0083884 A1    Apr. 12, 2007

Related U.S. Application Data

(60) Provisional application No. 60/725,316, filed on Oct. 12, 2005.

(30) Foreign Application Priority Data
Oct. 21, 2005    (KR)    .................. 10-2005-0099648

(51) Int. Cl.
H04N 7/10    (2006.01)
H04N 7/025    (2006.01)
H04N 7/20    (2006.01)
H04N 7/173    (2006.01)
G08B 9/00    (2006.01)

(52) U.S. Cl. .............................. 725/33; 725/34; 725/68; 725/70; 725/71; 725/108; 340/286.02

(58) Field of Classification Search ............ 725/32–35, 725/68, 70–71, 108; 340/286.02
See application file for complete search history.

(56) References Cited

U.S. PATENT DOCUMENTS

| | | | | | |
|---|---|---|---|---|---|
| 5,121,430 | A | * | 6/1992 | Ganzer et al. ............... | 380/258 |
| 5,495,283 | A | * | 2/1996 | Cowe ........................... | 725/33 |
| 5,760,820 | A | * | 6/1998 | Eda et al. ..................... | 725/33 |
| 6,493,876 | B1 | * | 12/2002 | DeFreese et al. ............. | 725/100 |
| 6,543,051 | B1 | * | 4/2003 | Manson et al. ................ | 725/33 |
| 7,308,697 | B1 | * | 12/2007 | Jerding et al. ................. | 725/34 |
| 7,454,773 | B2 | * | 11/2008 | Pugel et al. ................... | 725/33 |
| 7,506,349 | B2 | * | 3/2009 | Rodolico ....................... | 725/33 |
| 2003/0133043 | A1 | * | 7/2003 | Carr .............................. | 725/151 |
| 2003/0208767 | A1 | * | 11/2003 | Williamson et al. .......... | 725/93 |
| 2003/0216133 | A1 | * | 11/2003 | Poltorak ..................... | 455/3.01 |
| 2006/0059495 | A1 | * | 3/2006 | Spector ....................... | 709/206 |
| 2007/0157209 | A1 | * | 7/2007 | Hashimoto et al. .......... | 718/104 |

FOREIGN PATENT DOCUMENTS

EP    1603111 A1 * 12/2005

* cited by examiner

Primary Examiner—Christopher Kelley
Assistant Examiner—Randy Flynn
(74) Attorney, Agent, or Firm—McKenna Long & Aldridge LLP

(57) ABSTRACT

A terrestrial digital television receiver includes a tuner, a demodulator, a demultiplexer, a decoder, and a controller. The tuner receives a terrestrial television signal having an emergency alert table which contains text representing an emergency alert message. The demodulator demodulates the television signal and the demultiplexer demultiplexes the emergency alert table from the demodulated signal. The decoder parses the text data representing the emergency alert message, and the controller control operation of a display device such that the emergency alert message is scrolled across a predetermined portion of a video screen.

8 Claims, 11 Drawing Sheets

| Alert_Priorty | Meaning | Channel Tuning |
|---|---|---|
| 0 | Test Message | X |
| 1~7 | [Reserved] | X |
| 8 | Medium Priority : Message Scrolling | X |
| 8~14 | [Reserved] | X |
| 15 | High Priority : Message Scrolling & EAS Channel Tuning | O |

FIG. 1A

| Syntax | Bits | Description |
|---|---|---|
| table_ID | 8 | value 0xD8 |
| section_syntax_indicator | 1 | '1' |
| zero | 1 | '0' |
| reserved | 2 | '11' |
| section_length | 12 | uimsbf |
| table_id_extension | 16 | '0x0000' |
| reserved | 2 | '11' |
| sequence_number | 5 | uimsbf |
| current_next_indicator | 1 | bslbf |
| section_number | 8 | uimsbf |
| last_section_number | 8 | uimsbf |
| protocol_version | 8 | uimsbf |
| EAS_originator_code | 24 | Three ASCII characters |
| EAS_event_code_length | 8 | uimsbf (N) |
| EAS_event_code | 8*N | N ASCII characters |
| nature_of_activation_text_length | 8 | uimsbf |
| nature_of_activation_text() | var | uimsbf |
| alert_message_time_remaining | 8 | uimsbf range 0~120 |
| event_start_time | 32 | uimsbf |
| event_duration | 16 | uimsbf range 15~6000 |
| reserved | 12 | bslbf |
| alert_priority | 4 | uimsbf |
| details_channel_source | 4 | bslbf |
| reserved | 4 | '1111' |
| details_major_channel_number | 16 | uimsbf |
| details_minor_channel_number | 16 | uimsbf |
| details_carrier_frequency | 32 | uimsbf |
| details_program_number | 8 | uimsbf |

| Syntax | Bits | Description |
|---|---|---|
| details_channel_TSID | 16 | uimsbf |
| alert_text_length | 16 | uimsbf |
| alert_text_rate | 16 | uimsbf |
| alert_text() | var | var |
| location_code_count | 8 | uimsbf |
| for (l=0;l<location_code_count;l++){ | | |
| country_code | 8 | uimsbf 0~255 |
| state_code | 8 | uimsbf 0~99 |
| county_subdivision | 4 | uimsbf 0~9 |
| reserved | 2 | '11' |
| county_code | 10 | uimsbf 0~999 |
| } | | |
| exception_count | 8 | uimsbf |
| for{l=0;l<exception_count;l++}{ | | |
| exception_major_channel_number | 16 | uimsbf |
| exception_minor_channel_number | 16 | uimsbf |
| } | | |
| reserved | 6 | '111111' |
| description_length | 10 | uimsbf |
| for{l=0;l<N;l++}{ | | |
| descriptor() | var | Optional |
| } | | |
| CRC_32 | 32 | |

FIG. 1B

| Syntax | Bits | Description |
|---|---|---|
| details_channel_descriptor() { | | |
| descriptor_tag | 8 | 0xAD |
| descriptor_length | 8 | uimsbf |
| details_channel_source | 4 | uimsbf |
| details_carrier_frequency | 32 | uimsbf |
| details_program_number | 8 | uimsbf |
| details_channel_TSID | 16 | uimsbf |
| } | | |

FIG. 2

| Alert_Priorty | Meaning | Channel Tuning |
|---|---|---|
| 0 | Test Message | X |
| 1~7 | [Reserved] | X |
| 8 | Medium Priority : Message Scrolling | X |
| 8~14 | [Reserved] | X |
| 15 | High Priority : Message Scrolling & EAS Channel Tuning | O |

FIG. 6

| Syntax | No. of Bits | Fromat |
|---|---|---|
| master_guide_table_section (){ | | |
|     table_id | 8 | 0xC7 |
|     section_syntax_indicator | 1 | '1' |
|     private_indicator | 1 | '1' |
|     Reserved | 2 | '11' |
|     section_length | 12 | Uimsbf |
|     table_id_extension | 16 | 0x0000 |
|     Reserved | 2 | '11' |
|     version_number | 5 | Uimsbf |
|     current_next_indicator | 1 | '1' |
|     section_number | 8 | 0x00 |
|     last_section_number | 8 | 0x00 |
|     protocol_version | 8 | Uimsbf |
|     tables_defined | 16 | Uimsbf |
|     for(i=0; i<tables_defined; i++){ | | |
|         table_type | 16 | Uimsbf |
|         reserved | 3 | '111' |
|         table_type_PID | 13 | Uimsbf |
|         reserved | 3 | '111' |
|         table_type_version_number | 5 | Uimsbf |
|         number_bytes | 32 | Uimsbf |
|         Reserved | 4 | '1111' |
|         table_type_descriptors_length | 12 | Uimsbf |
|         for (k=0; k<N; k++){ | | |
|             descriptor() | | |
|         } | | |
|     } | | |
|     emergency_flag | 1 | Uimsbf |
|     Reserved | 3 | '111' |
|     descriptors_length | 12 | Uimsbf |
|     for (I=0; I<N; I++){ | | |
|         descriptor() | | |
|     } | | |
|     CRC_32 | 32 | rpchof |
| } | | |

FIG. 7

| Syntax | No. of Bits | Fromat |
|---|---|---|
| master_guide_table_section (){ | | |
|     table_id | 8 | 0xC7 |
|     section_syntax_indicator | 1 | '1' |
|     private_indicator | 1 | '1' |
|     Reserved | 2 | '11' |
|     section_length | 12 | Uimsbf |
|     table_id_extension | 16 | 0x0000 |
|     Reserved | 2 | '11' |
|     version_number | 5 | Uimsbf |
|     current_next_indicator | 1 | '1' |
|     section_number | 8 | 0x00 |
|     last_section_number | 8 | 0x00 |
|     protocol_version | 8 | Uimsbf |
|     tables_defined | 16 | Uimsbf |
|     for(i=0; i<tables_defined; i++){ | | |
|         table_type | 16 | Uimsbf |
|         reserved | 3 | '111' |
|         table_type_PID | 13 | Uimsbf |
|         reserved | 3 | '111' |
|         table_type_version_number | 5 | Uimsbf |
|         number_bytes | 32 | Uimsbf |
|         Reserved | 4 | '1111' |
|         table_type_descriptors_length | 12 | Uimsbf |
|         for (k=0; k<N; k++){ | | |
|             descriptor() | | |
|         } | | |
|     } | | |
|     Reserved | 4 | '1111' |
|     descriptors_length | 12 | Uimsbf |
|     for (I=0; I<N; I++){ | | |
|         descriptor() | | |
|     } | | |
|     CRC_32 | 32 | rpchof |
| } | | |

Fire at Building-A in seoul

Terror at Building-A in Seoul

EMERGENCY ALERT SIGNALING METHOD AND DIGITAL TELEVISION RECEIVER

This application claims the benefit of U.S. Provisional Application No. 60/725,316, filed on Oct. 12, 2005, which is hereby incorporated by reference. This application also claims the benefit of Korean Patent-Application No. 10-2005-0099648, filed on Oct. 21, 2005, which is hereby incorporated by reference.

BACKGROUND OF THE INVENTION

1. Field of the Invention

The present invention relates to an emergency alert signaling method and digital television receiver. Although the present invention is suitable for a wide scope of applications, it is particularly suitable for providing information associated with an emergency to a user quickly and efficiently in the terrestrial broadcasting.

2. Discussion of the Related Art

Recently, natural disasters including an unexpected earthquake, a flood and the like or emergency situations including a terror, incendiarism and the like are frequently take place. Moreover, damages caused by the natural disaster due to an environmental pollution or by the terror are widely expanded and their spreading effects get more powerful.

In case that the above-illustrated emergency takes place, a terrestrial broadcasting station collects data of the emergency, adjusts the collected data and then sends news relating to the emergency in a format of a newsflash or the like after duration.

In case that the emergency takes place, almost every terrestrial broadcasting station transmits the newsflash to broadcast news associated with the emergency to viewers.

However, in operating the emergency alert system for the emergency in the terrestrial broadcasting, the related art has the following problems.

First of all, all channels of the terrestrial broadcasting simultaneously broadcast the almost similar newsflashes. Hence, it is undesirable in aspect of the efficient management of the terrestrial broadcasting.

Secondly, as mentioned in the above description, if all channels of the terrestrial broadcasting simultaneously broadcast the almost similar newsflashes, viewers located in an area having nothing to do with the emergency are unable to watch regular terrestrial broadcasts.

Thirdly, each broadcasting station collects the news data associated with the emergency at a different speed. Hence, a time point of delivering the news associated with the emergency to a viewer at the first time depends on what kind of channel the viewer is watching.

SUMMARY OF THE INVENTION

Accordingly, the present invention is directed to an emergency alert signaling method and digital television receiver that substantially obviate one or more problems due to limitations and disadvantages of the related art.

An object of the present invention is to provide an emergency alert signaling method and digital television receiver, by which terrestrial broadcast channels can be efficiently used instead of using the entire terrestrial broadcast channels to deliver news associated with an emergency.

Another object of the present invention is to provide an emergency alert signaling method and digital television receiver, by which a regular terrestrial broadcast can be normally sent on the air while emergency information is provided to viewers.

A further object of the present invention is to provide an emergency alert signaling method and digital television receiver, by which news associated with an emergency can be quickly provided to all viewers at the same time point regardless of whether a viewer is watching a specific terrestrial broadcast channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terrestrial digital television receiver includes a tuner, a demodulator, a decoder, and a controller. The tuner receives a terrestrial television signal from a broadcast transmitter. The television signal includes an emergency alert table containing text data which represent an emergency alert message. The demodulator demodulates the terrestrial television signal, and the demultiplexer demultiplexes the emergency alert table from the demodulated television signal. The decoder parses the text data representing the emergency alert message from the demultiplexed emergency alert table. Finally, the controller controls operation of a display device such that the emergency alert message scrolls the emergency alert message across a predetermined portion of a video screen.

The emergency alert table may further include priority information specifying an alert priority of the emergency alert message. For example, if the alert priority of the emergency alert message is high, the tuner may automatically tune to a predefined emergency alert channel. The emergency alert table may further include channel source information identifying the predefined emergency alert channel as being one of an analog and a digital channel. The table may further include channel information specifying major and minor channel numbers, a physical channel number, a program number, and a transport stream identifier (TSID) of the predefined emergency alert channel, respectively.

In addition, the emergency alert table may further include message display information specifying a scroll rate of the emergency alert message across the predetermined portion of the video screen. Furthermore, the table may further include at least one alert region information defining at least one region affected by the emergency alert message. Each alert region information may include a country code identifying a country and local region codes defining a local region within the identified country. For example, the local region codes may represent a state, a country subdivision, and a county to define a particular local region within a country.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1A is an exemplary diagram of a bit stream syntax of an emergency alert table according to the present invention;

FIG. 1B is an exemplary diagram of a bit stream syntax of a descriptor of an emergency alert table according to the present invention;

FIG. 2 is an exemplary diagram of a meaning corresponding to an 'alert_priority' field value according to the present invention;

FIG. 6 is a bit stream syntax of MGT (master guide table) according to one embodiment of the present invention;

FIG. 7 is a bit stream syntax of MGT (master guide table) according to another embodiment of the present invention;

DETAILED DESCRIPTION OF THE INVENTION

Figure 3:
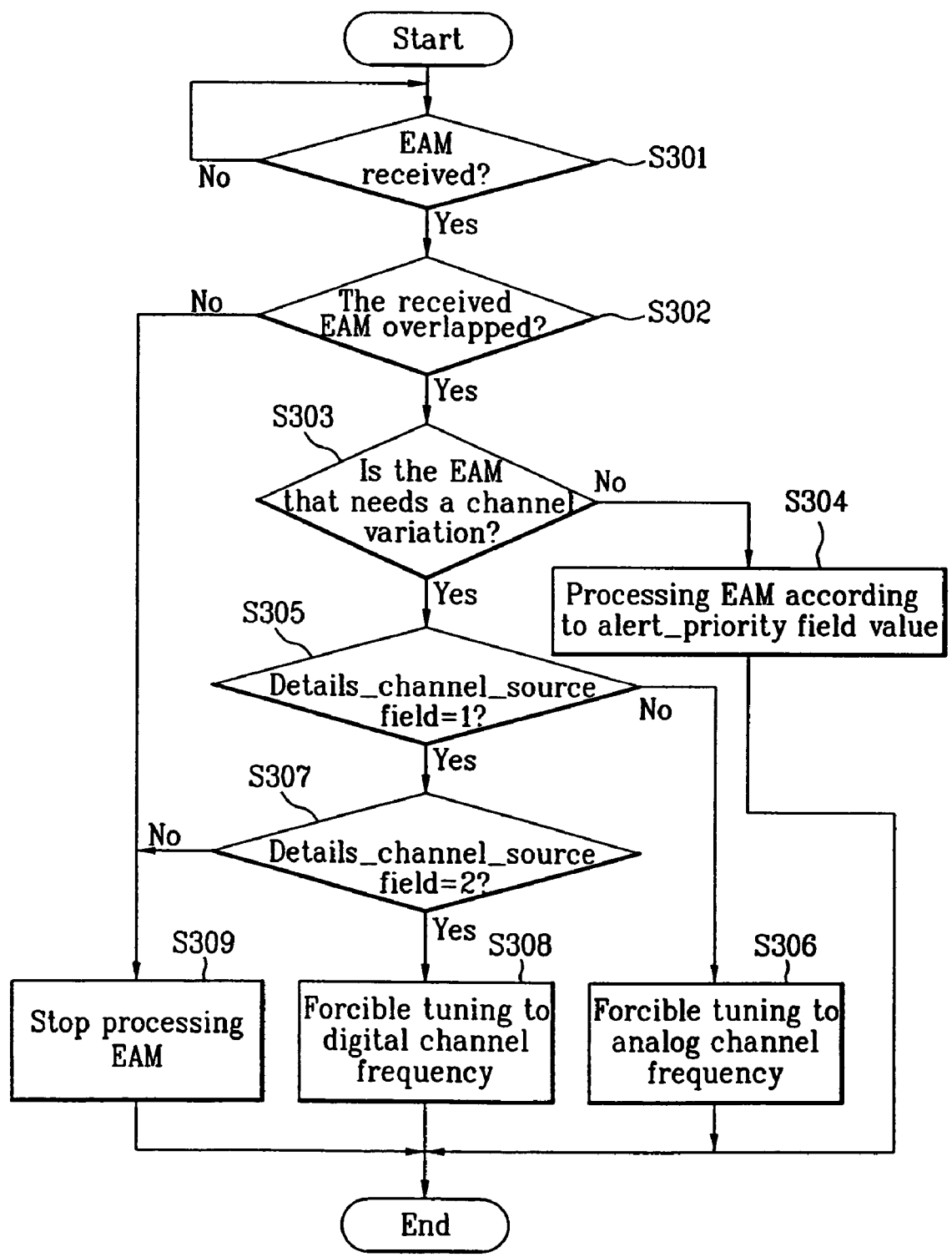
FIG. 3 is a flowchart of a method of deciding whether a broadcast channel carrying an emergency alert message is an analog channel or a digital channel using a 'details_channel_source' field value according to the present invention.

Reference will now be made in detail to the preferred embodiments of the present invention, examples of which are illustrated in the accompanying drawings. Wherever possible, the same reference numbers will be used throughout the drawings to refer to the same or like parts.

First of all, for the clear explanation, 'description about EAT (emergency alert table) for operating an emergency alert system of terrestrial broadcasting', 'description about a method of defining PID (packet identifier) of the EAT', 'description about a method of confirming information of emergency occurrence using MGT (master guide table)' and 'description about a method of displaying the information of the emergency occurrence by substantially confirming the information in a terrestrial broadcast receiver' are explained as follows.

FIG. 1A is an exemplary diagram of a bit stream syntax of an emergency alert table according to the present invention.

A bit stream syntax defined in EAT is explained as follows. The present invention is characterized in defining a separate table, which does not exist in conventional terrestrial broadcasting, including information associated with an emergency.

Yet, the EAT can be defined in a manner of being newly added to the PSIP protocol of terrestrial broadcasting. It is able to decide whether an emergency has taken, place by transmitting the EAT from a terrestrial broadcasting transmitter and by parsing the transmitted EAT in a terrestrial broadcast receiver.

Syntaxes configuring the EAT, as shown in FIG. 1A, are explained one by one as follows. For the clear explanation, double quotation marks will be given to the syntaxes configuring the EAT, respectively.

Referring to FIG. 1A, "table_ID" is a syntax indicating that the EAT can be used as a table including information about an emergency alert message of terrestrial broadcasting and can be set 0xD8 for example.

"section_syntax_indicator" can be set to have a value of 1 and can be used as a syntax meaning to follow a general MPEG-2 section syntax next to a "section_length" field.

"section_length" defines a number of Remaining bytes and can be set to a value smaller than 4093.

"sequence_number" can indicate a sequence of an emergency alert message. If the semantic of the message is changed, "sequence_number" can be incremented to a value to 31 from 0. The "sequence_number" field can indicate a version of the emergency alert message.

"current_next_indicator" indicates that a transmitted table is always applicable and can be set to a value of 1.

"section_number" indicates that the transmitted table occupies a length of at least one section and can be set to 0x00.

"protocol_version" indicates a version value of a PSIP (program and system information protocol).

"EAS_originator_code" can indicate an entity that activates an EAS (emergency alert system).

"EAS_event_code_length" can indicate a length of "EAS_event_code".

"EAS_event_code" can indicates a type of an EAS and can represent a type of an emergency such as a flood, a terror, an earthquake and the like together with detailed information of the emergency such as a large-scale earthquake, a medium-scale earthquake, a small-scale earthquake and the like for example.

"nature_of_activation_text_length" can indicate a length of "nature_of_activation_text". For instance, if a "nature_of_activation_text_length" field value is '0', it can mean that "nature_of_activation_text" is not included in a present emergency alert message.

"nature_of_activation_text" can include a specific syntax representing a textual representation of an event code displayed on a screen.

"alert_message_time_remaining" can indicate a remaining output time of an emergency alert message. For instance, "alert_message_time_remaining" can be set to a unit of 0~120 seconds. A zero value may represent an infinite duration. And, the "alert_message_time_remaining" field can indicate a duration time, which should continue from a time point of rendering an emergency alert message into an interrupt service to a returning time point of the emergency alert, by a unit of seconds.

"event_start_time" can represent a start time of an EAM event by a unit of seconds after 00 hours UTC, Jan. 6, 1980. If the field is a past time by being compared to an STT time of a corresponding channel with reference to a GPS time, a terrestrial broadcast receiver side ignores the EAT. If the filed is a future time, the field value is compared to an "event_duration" field value to decide whether to load the EAT in a memory of the terrestrial broadcast receiver.

"event_duration" is a time to sustain an emergency alert and can employ a unit of minutes. A zero value may mean that the time to sustain the emergency alert is not confirmed. The terrestrial broadcast receiver side can delete a past EAM event, which is stored in the memory of the terrestrial broadcast receiver but is not necessary anymore, using the "event_start_time" field and the "event_duration" field.

And, "alert_priority" can mean a syntax indicating significance or priority of an emergency. Furthermore, the "alert_priority" can mean a syntax specifying an alert priority of an emergency alert message. According to the alert of the emergency alert message, a DTV can be tuned to a predefined emergency alert channel automatically.

FIG. 2 is an exemplary diagram of a meaning corresponding to an 'alert_priority' field value according to the present invention.

Referring to FIG. 2, if a priority is '0' for example, a terrestrial broadcasting transmitting side can just send a test message. If a priority is '8', information for controlling a message associated with an emergency to be scrolled on a screen of a terrestrial broadcast receiver can be transmitted. If a priority is '15' that means a highest priority, information for controlling a message associated with an emergency to be scrolled on a screen of a terrestrial broadcast receiver is transmitted as well as information for forcibly tuning to a specific channel carrying news associated with the emergency.

Of course, the specific channel can correspond to a previously existing channel of terrestrial broadcasting or to a new frequency channel of terrestrial broadcasting, for example.

Yet, the above-illustrated numerical values are exemplary and are not intended to put limitation of claims of the present invention.

"details_channel_source" is a field that clearly defines whether a broadcast channel of an emergency alert message is an analog channel or a digital channel. For instance, a channel type of an emergency broadcast, as shown in Table 1, according to a "details_channel_source" field can be defined for example. Furthermore, the "details_channel_source" can mean a syntax identifying the emergency alert channel as being one of an analog and a digital channel.

If the "details_channel_source" field value is '00' or '11', it can be defined as 'unused'. If the "details_channel_source" is '01', it can be defined as "analog channel". If the "details_channel_source" is '10', it can be defined as 'digital channel'. In this case, if a minor channel number is 0, it is facilitated to decide whether an emergency channel is an analog channel or a digital channel according to Table 1.

FIG. 3 is a flowchart of a method of deciding whether a broadcast channel carrying an emergency alert message is an analog channel or a digital channel using a 'details_channel_source' field value according to the present invention. A method of facilitating to identify an analog channel or a digital channel is explained in detail with reference to FIG. 3 as follows.

Referring to FIG. 3, if an emergency alert message is received by a terrestrial broadcast receiver side (S301), it is decided whether the received emergency alert message is overlapped with a previously received emergency alert message (S302). If the currently received emergency alert message is overlapped with the previous emergency alert message in the step S302, the currently received emergency alert message is not processed (S309). If the currently received emergency alert message is not overlapped with the previous emergency alert message in the step S302, it is decided whether the currently received emergency alert message is an emergency alert message that needs a forcible switching to an emergency broadcast channel (S303).

If it is decided that the currently received emergency alert message is not the emergency alert message that needs the forcible switching to the emergency broadcast channel in the step S303, the received emergency alert message is processed according to a "alert_priority" field value (S304).

If it is decided that the currently received emergency alert message is the emergency alert message that needs the forcible switching to the emergency broadcast channel in the step S303, it is decided whether a "details_channel_source" field value is 1 (S305). Of course, the numerical value is just exemplary.

If the "details_channel_source" field value is 1 in the step S305, the broadcast channel decided as the analog channel and is then forcibly tuned to a physical channel frequency of a terrestrial analog channel corresponding to an emergency broadcast channel configured with a major channel number (details_major_channel_number) (S306).

If the "details_channel_source" field value is not 1 in the step S305, it is decided again whether the "details_channel_source" field value is 2 (=10) (S307). Of course, the numerical values are just exemplary.

If "details_channel_source" field value is 2 in the step S307, the broadcast channel is decided as the digital channel and is then forcibly tuned to a physical channel frequency of a terrestrial digital channel corresponding to an emergency broadcast channel obtained by parsing, a major channel number field (details_major_channel_number) and a minor channel number (details_minor_channel_number) field (S308).

Yet, if a minor channel number is 0, it is the digital channel represented as one-part. If the minor channel number is not 0, it may be the digital channel represented as two-part.

If it is decided that the "details_channel_source" field value is neither 1 nor 2, it means that an error or the like takes place. Hence, a processing of the emergency alert message is stopped (s309).

"details_major_channel_number" is used as a field indicating a major channel number associated with details channel.

"details_minor_channel_number" is used as a field indicating a minor channel number associated with details channel.

"details_carrier_frequency" is used as a field indicating a physical channel number of a channel to be forcibly tuned in case of an emergency occurrence.

"details_channel_program_number" is used as a field indicating a program number of a channel to be forcibly tuned in case of an emergency occurrence. Furthermore, the "details_channel_program_number" can mean a syntax identifying a program number of the emergency alert channel.

"details_channel_TSID" is used as a field indicating ID (identifier) of a transport stream of a channel to be forcibly tuned in case of an emergency occurrence. Furthermore, the "details_channel_TSID" can mean a syntax identifying a transport stream identifier of the emergency alert channel.

"alert_text_length" is used as a field indicating a total byte number of an "alert_text( )" field. For instance, if an "alert_text_length" field value is 0, it can be indicated that the "alert_text( )" field is not included in an emergency alert message.

An "alert_text_rate" field is used as a field indicating a scroll speed of scroll data parsed in the "alert_text( )" field, i.e., a scroll speed of an emergency alert content. For instance, a speed enabling a viewer to recognize the scroll data optimally can be determined with reference to a size of data to be scrolled (i.e., "alert_text_length" field value) and an emergency alert message duration time (i.e., "alert_message_time_remaining" field value).

The "alert_text_rate" field includes information for setting a scroll speed of text including an emergency alert message differently according to a field (e.g., "alert_priority") value indicating the significance of the emergency. Furthermore, the "alert_text_rate" can mean a syntax specifying a scroll rate of the emergency alert message across a portion of a video screen.

For instance, sixteen bits are allocated to the "alert_text_rate" field and the scroll speed is represented as an unsigned integer number (uimsbf). In particular, the scroll speed can describe a time by a unit of seconds from an initial scroll of a first character until the character disappears from a screen or a time by a unit of seconds from an initial scroll of a first character until a last character ends its scroll.

The "alert_text( )" field has a data structure including a specific syntax (e.g., "multiple_string_structure( )", etc.) representing a textual description of an emergency alert on an OSD (on screen display). An emergency alert text can be set to be slowly scrolled from a lower side to an upper side or from a right side to a left side on a screen of a terrestrial broadcast receiver for example.

"location_code_count" is used as a field for counting a region definition coming along a 'for loop' syntax. For instance, the "location_code_count" field can have an integer number between 1~31.

In the region definition, a region name according to an administrative district division in U.S.A is exemplarily used. Yet, claims of the present invention are not limited to the detailed region name.

"country_code" is used as a field for defining a code of a country associated with an emergency. For instance, eight bits can be allocated to the "country_code" field. Furthermore, the "country_code" can mean a syntax defining at least one region affected by the emergency alert message, each alert region information comprising a country code identifying a country and at least one local region code defining a local region within the identified country.

The 8-bit "country_code" can indicate 256 countries theoretically, which is enough to specify all the 210~220 currently existing countries. Of course, eight bits are exemplarily allocated to the "country_code" field. Hence, more or less than 8 bits can be allocated to the "country_code" field, which is a designer's option.

"state_code" is used as a field indicating a state or territory associated with an emergency. For instance, with values between 0~99, the "state_code" field can be coded according to a state and an FIPS number code. If the field value is 0, it can indicate an emergency of all states.

"country_subdivision" is used as a field defining a county subdivision and includes 4-bit numerals between 0~9.

"county_code" is used as a field indicating a specific county of the state associated with the emergency and has a value between 0~999. The "county_code" can be coded according to a state and an FIPS number code of an area. If the field value is 0, it can indicate an emergency of all counties.

"exception_major_channel_number", which is not 0, is used as a field indicating a major channel number of an exception service associated with an in-band SI.

"exception_minor_channel_number", which is not 0, is used as a field indicating a minor channel number of an exception service associated with an in-band SI.

FIG. 1B is an exemplary diagram of a bit stream syntax of a descriptor of an emergency alert table according to the present invention.

If we are to design an emergency alert table(EAT), there are two methods. One method is that makes the EAT as FIG. 1A. The other method is that adds a descriptor of FIG. 1B to the EAT.

As shown in FIG. 1B, "descriptor_tag" can identifies the type of descriptor. And "descriptor_length" can follows the "descriptor_length" itself.

"details_channel_source", "details_carrier_frequency", "details_program_number", and "details_channel_TSID" are same to "details_channel_source", "details_carrier_frequency", "details_program_number", and "details_channe;_TSID" of FIG. 1A.

In a present embodiment of the present invention, a method of defining a PID (packet identifier) of the above-explained EAT. Yet, the PID of the EAT is an packet ID necessary for identifying the EAT from other tables.

Figure 4:
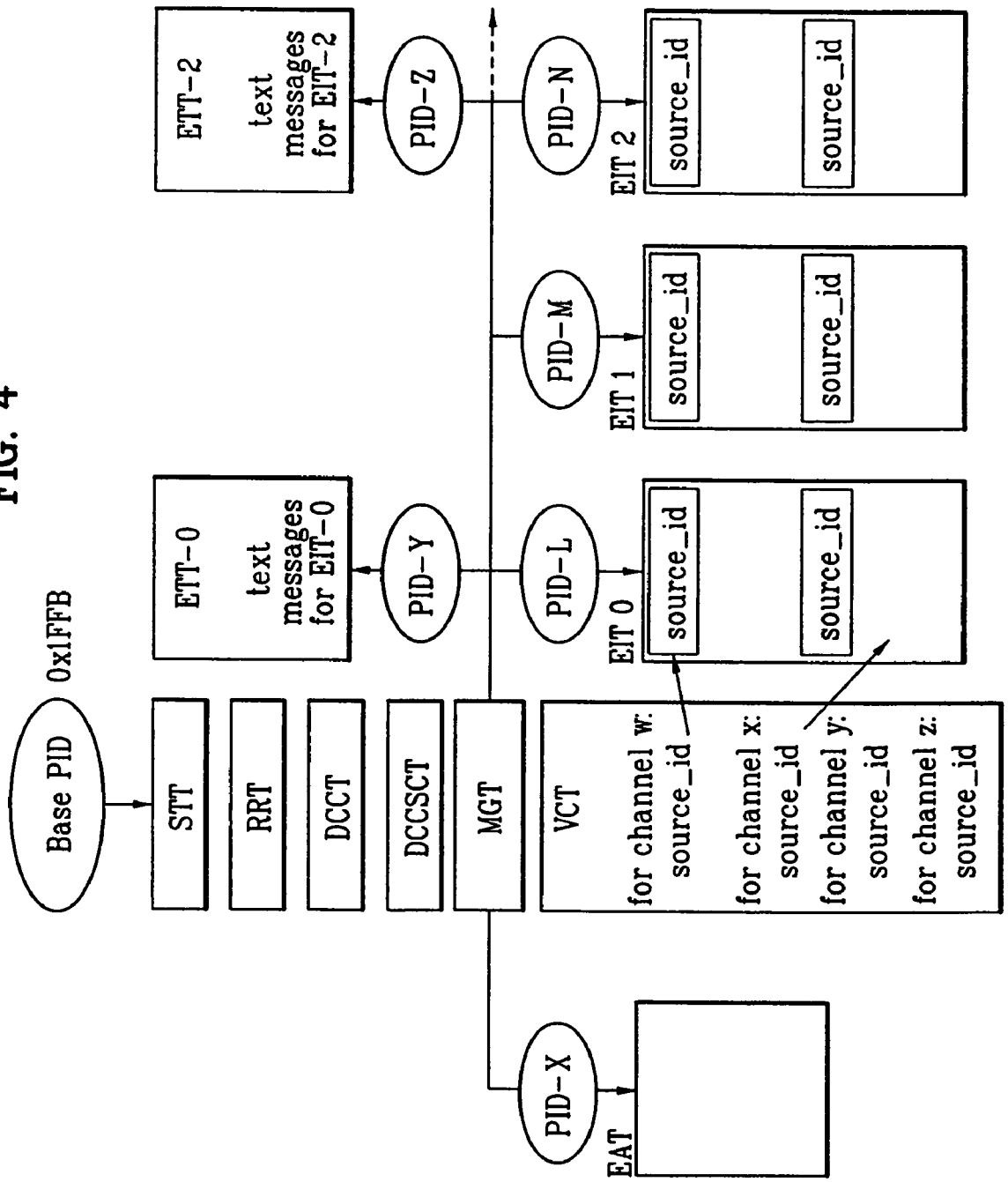
FIG. 4 is a diagram of a PSIP table hierarchy structure including EAT (emergency alert table) according to one embodiment of the present invention.
Figure 5:
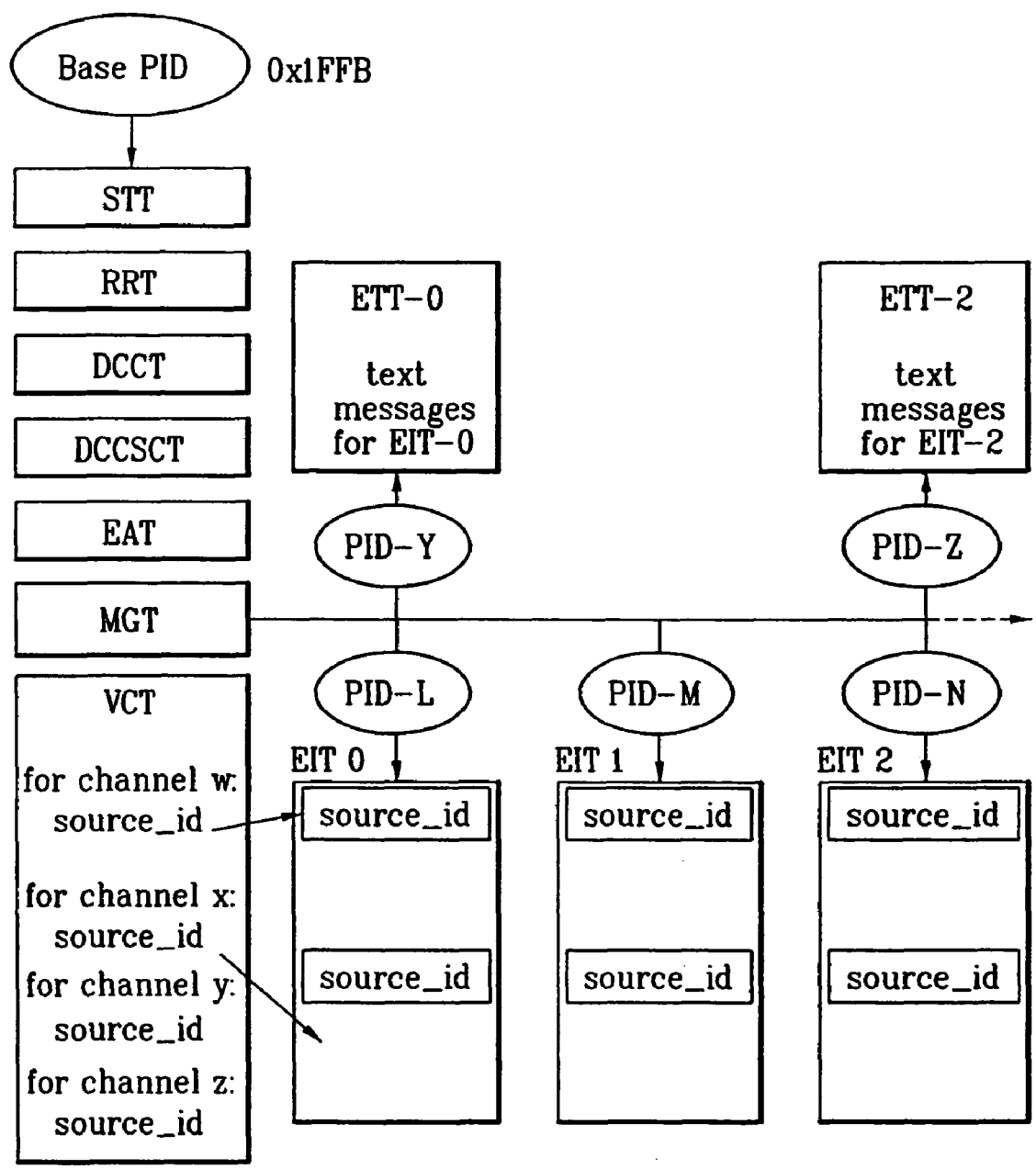
FIG. 5 is a diagram of a PSIP table hierarchy structure including EAT (emergency alert table) according to another embodiment of the present invention.

FIG. 4 is a diagram of a PSIP table hierarchy structure including EAT (emergency alert table) according to one embodiment of the present invention and FIG. 5 is a diagram of a PSIP table hierarchy structure including EAT (emergency alert table) according to another embodiment of the present invention. Two kinds of methods of defining a PID of EAT are explained with reference to FIG. 4 and FIG. 5 as follows.

A first method, as shown in FIG. 4, is to set a PID of EAT to be dependent on MGT. In this case, a terrestrial broadcast receiver side reads out an EZT not by directly checking the EAT among numerous tables of PSIP data but by checking a PID defined by the MGT.

Yet, the MGT (master guide table) is set as a table that defines sizes, PIDs (packet identifiers), version numbers of associated specific tables.

For reference, an STT (system time table) is a table including time information necessary for an application of synchronization. An RRT (rating region table) defines a rating table valid for another region or country. And, a VCT (virtual channel table) provides a table for a virtual channel associated with navigation and tuning.

Moreover, a DCCT (directed channel change table) provides a table associated with information indicating that a terrestrial broadcast receiver is switched to a specific virtual channel at a specific time point of a specific situation. Besides, a DCCSCT (directed channel change selection code table) provides a table associated with information for permitting extensions of a basic category and a location code.

A second method, as shown in FIG. 5, is to set to a base PID independent from an MGT to have a fixed value. For instance, the base ID can be fixed to a value of 0x1FFB. In this case, unlike FIG. 4, it is advantageous that the EAT can be identified without checking PIDs of the MGT one by one.

Information indicating that an emergency has taken place is transmitted from a terrestrial broadcast transmitting side to a terrestrial broadcast receiver. And, the terrestrial broadcast receiver side should confirm the information indicating that the emergency has taken place.

To confirm the information indicating that the emergency has taken place, two kinds of tables are proposed, which will be explained with reference to FIG. 6 and FIG. 7 later.

FIG. 6 is a bit stream syntax of MGT (master guide table) according to one embodiment of the present invention. An MGT bit stream syntax according to the present invention is explained with reference to FIG. 6 as follows.

First of all, to explain the MGT, a PSIP is simply explained as follows.

PSIP is an abbreviation of program and system information protocol, means a broadcasting protocol for transmitting channel and broadcast program guide information, and defines tables such as STT (system time table), RRT (rating region table), VCT (virtual channel table), MGT (master guide table) and the like.

In particular, the MGT means a table that defines sizes, PIDs (packet identifiers), version numbers and the like of all tables associated with the PSIP.

For the present embodiment of the present invention, a portion of a reserved field in a bit stream syntax of MGT is used as an emergency flag. Yet, the emergency flag (emergency_flag) includes information notifying whether an emergency has taken place from a terrestrial broadcast transmitting side.

For instance, one bit, as shown in FIG. 6, is allocated to the emergency flag (emergency flag). Of course, claims of the present invention are not limited to one bit. If necessary, more bits can be allocated to the emergency flag (emergency_flag).

If the terrestrial broadcast transmitting side transmits an MGT by setting the emergency flag (emergency_flag) to '0', a terrestrial broadcast receiver side checks that the emergency flag (emergency_flag) of the received MGT is '0' and then confirms the emergency has taken place. Of course, the numerical value is just exemplary.

In this case, despite a channel that is being watched by a user, the terrestrial broadcast receiver side automatically tunes the channel to an emergency channel or an emergency alert channel.

Yet, the emergency channel or the emergency alert channel can employ one of previously exiting terrestrial broadcast channels or a separate frequency channel intermittently transmitting a broadcast about an emergency only.

Meanwhile, if the terrestrial broadcast transmitting side transmits an MGT by setting the emergency flag (emergency_flag) to '1', the terrestrial broadcast receiver side checks that the emergency flag (emergency_flag) of the received MGT is '1' and then confirms a normal state that the emergency has not taken place. Of course, the numerical value is just exemplary.

In this case, the automatic channel tuning process to the emergency channel is not executed but a normal broadcast image, which is being watched by a viewer, is outputted.

Of course, the illustrated numerical values '0' and '1' are just exemplary. If necessary, different numerical values are used or '0' and '1' are switched to each other.

FIG. 7 is a bit stream syntax of MGT (master guide table) according to another embodiment of the present invention. A bit stream syntax of MGT (master guide table) according to another embodiment of the present invention is explained with reference to FIG. 7 as follows. Yet, FIG. 7 differs from FIG. 6 In that a separate emergency flag (emergency_flag) is not employed.

In 'for loop' syntax shown in FIG. 7 an EAT (emergency alert table) is newly defined in direct. For instance, a size, PID, version number and the like of the EAT can be defined by an MGT. In particular, the version number of the EAT can correspond to "sequence_number" shown in FIG. 1. Yet, the "sequence_number" has been explained in the foregoing description, of which detailed explanation is skipped in the following.

For instance, in case that a new emergency has taken place, a terrestrial broadcast transmitting side transmits an EAT including "sequence_number" having a varied value to a terrestrial broadcast receiver. If the "sequence_number" is varied, the terrestrial broadcast transmitting side transmits an MGT including "version_number" having a varied value to the terrestrial broadcast receiver as well.

The terrestrial broadcast receiver confirms that the "version_number" of the MGT is varied and then decides that a new EAT or EAM was received.

Moreover, according to a detailed content of the EAT, a text scroll speed associated with an emergency is adjusted and a tuning to an emergency channel can be adjusted as well. Yet, the detailed contents of the EAT are explained in the description of FIG. 1, of which detailed explanation is skipped in the following.

Figure 8:
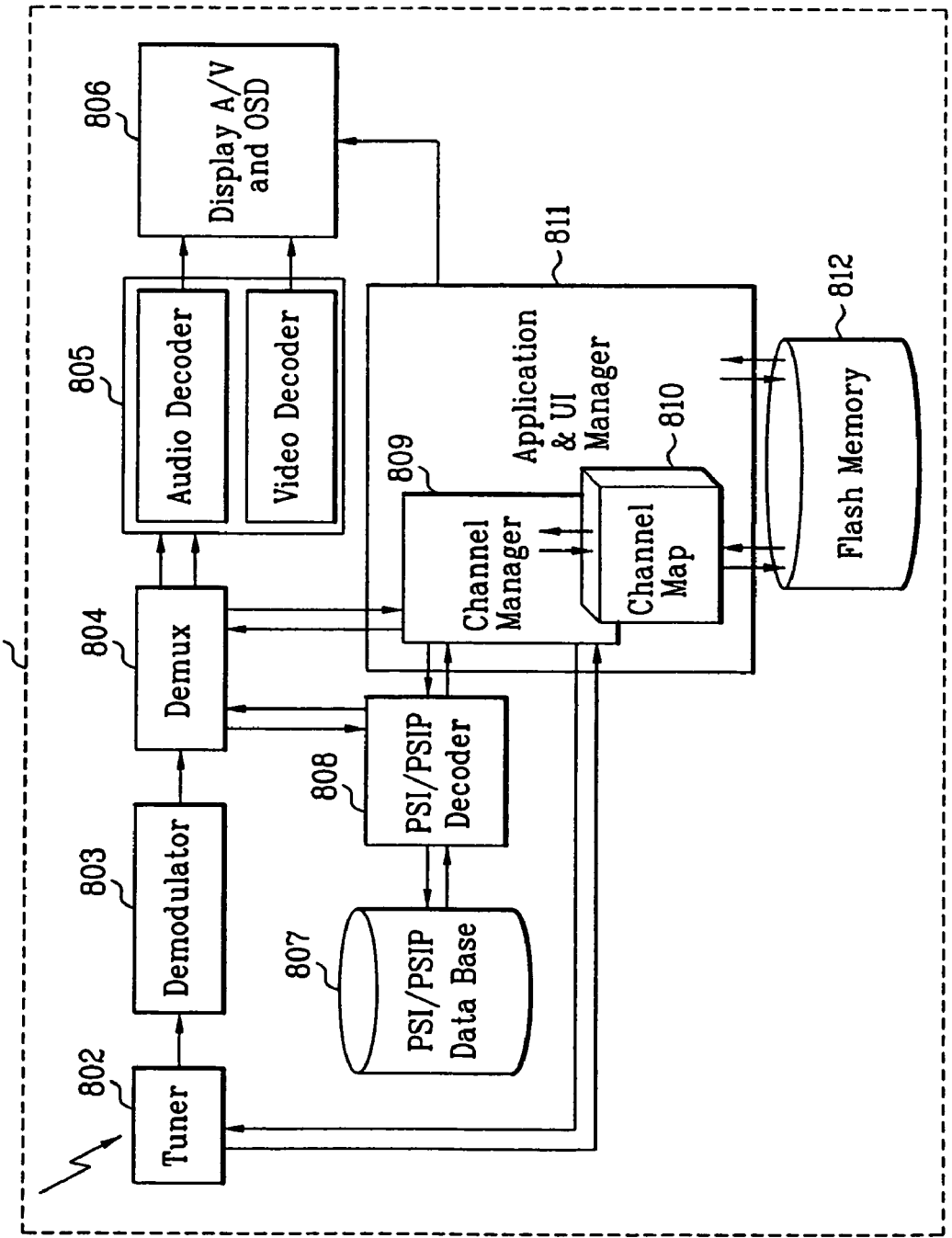
FIG. 8 is a block diagram of a terrestrial broadcast receiver according to the present invention.

FIG. 8 is a block diagram of a terrestrial broadcast receiver according to the present invention.

Figure 9A:
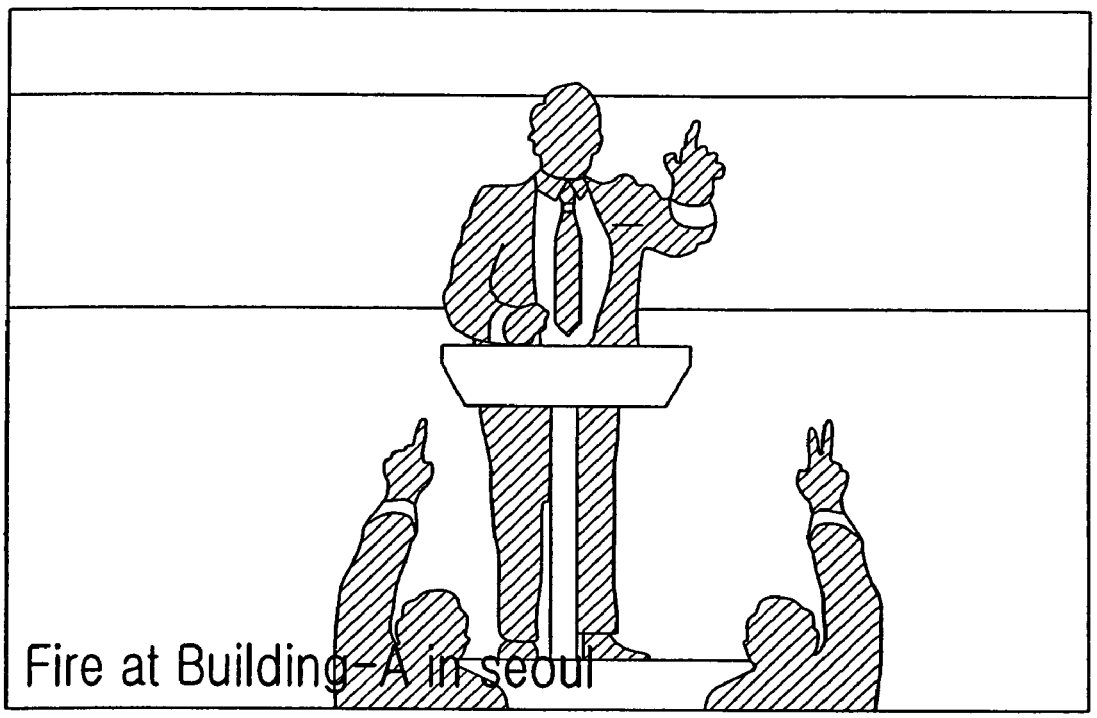
FIG. 9A is a diagram of an displayed image of an emergency alert message according to one embodiment of the present invention.

FIG. 9A is a diagram of an displayed image of an emergency alert message according to one embodiment of the present invention.

Figure 9B:
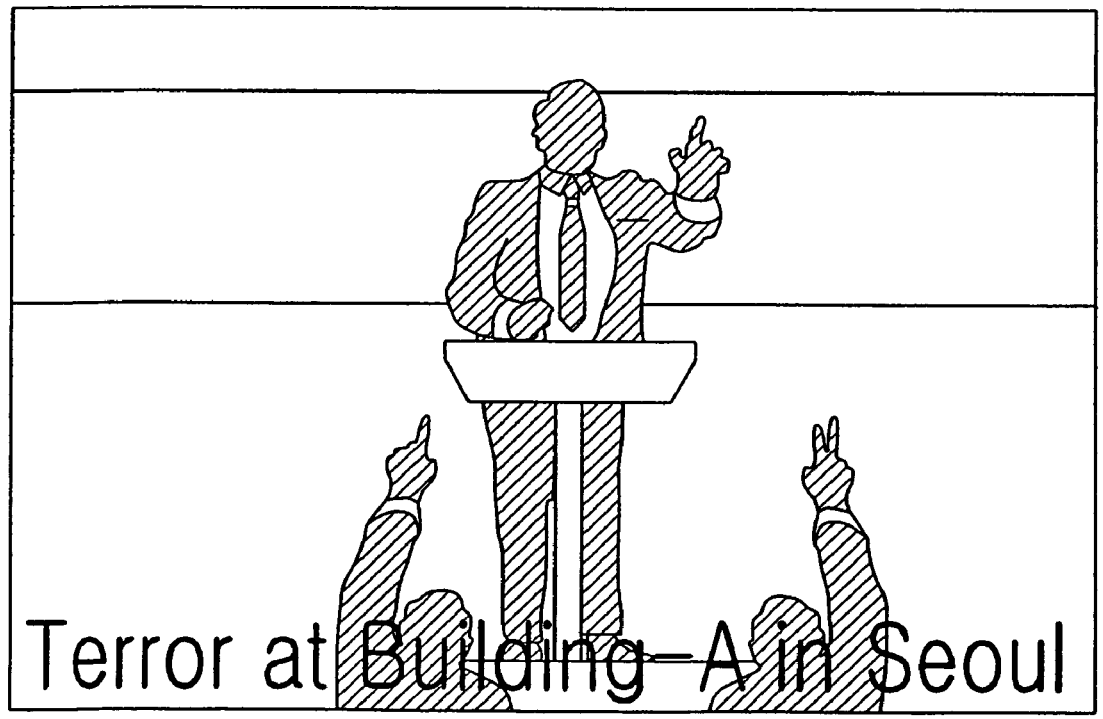
FIG. 9B is a diagram of an displayed image of an emergency alert message according to another embodiment of the present invention.

FIG. 9B is a diagram of an displayed image of an emergency alert message according to another embodiment of the present invention.

Figure 10A:
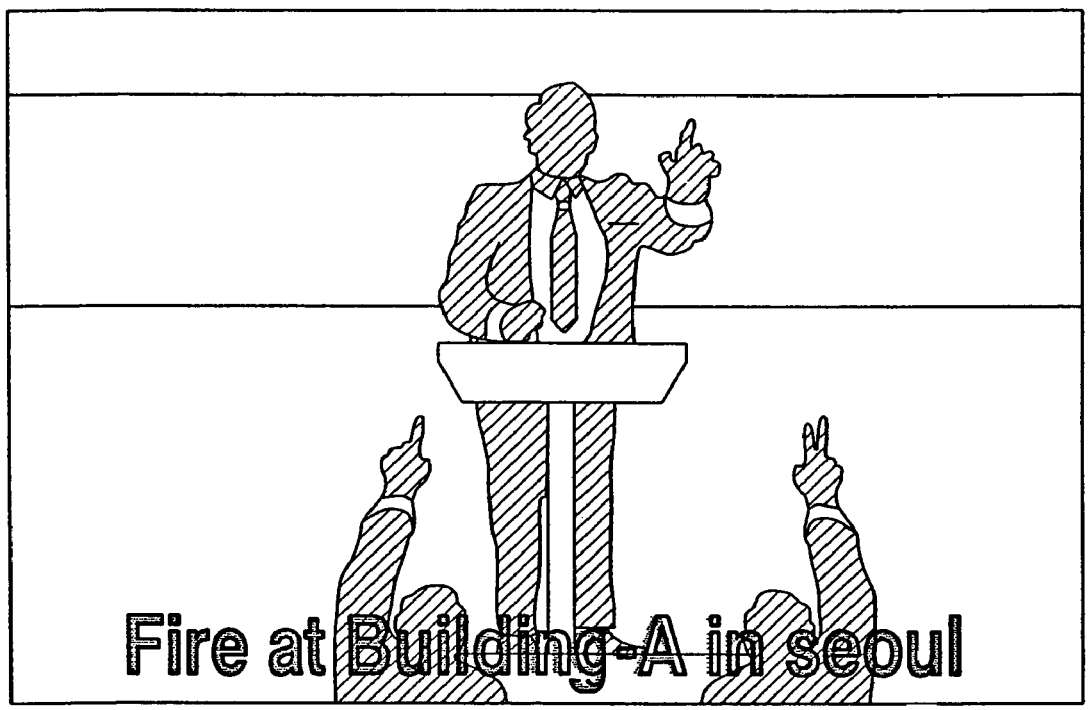
FIG. 10A is a diagram of an displayed image of an emergency alert message according to a further embodiment of the present invention.

FIG. 10A is a diagram of an displayed image of an emergency alert message according to a further embodiment of the present invention.

Figure 10B:
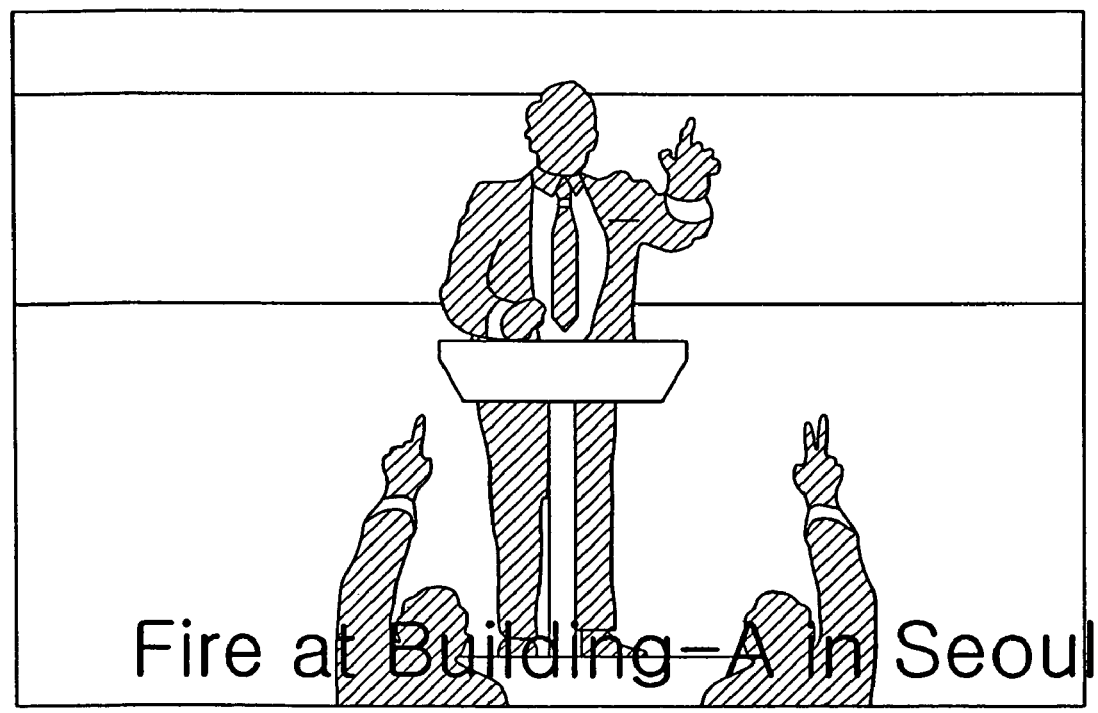
FIG. 10B is a diagram of a displayed image of an emergency alert message according to another further embodiment of the present invention.

FIG. 10B is a diagram of an displayed image of an emergency alert message according to another further embodiment of the present invention.

In the present embodiment of the present invention, a method that a terrestrial broadcast receiver receives and analyzes the above-explained EAT, outputs a message associated with an emergency or automatically tunes a channel to an emergency channel is explained with reference to FIGS. 8 to 10B as follows.

A terrestrial broadcast receiver 801 includes a tuner 802, a demodulator 803, a demultiplexer 804, an A/V decoder 805, a display unit 806, a PSI/PSIP database 807, a PSI/PSIP decoder 808, a channel manager 809, a channel map 810, an application & UI manager 811 and a flash memory 812 the terrestrial broadcast receiver includes a digital television (DTV) enabling, a reception of terrestrial broadcasting or the like for example.

The tuner 802 receives a terrestrial broadcast signal including a PSI/PSIP (program and system information/program and system information protocol) table. Yet, the PSIP table includes an EAT for example. And, an operation of the tuner 802 is controlled by the channel manager 809.

The tuner 802 records a result of receiving the terrestrial broadcast signal in the channel manager 809.

The demodulator 803 is operative in modulating a signal tuned by the tuber 802 into a VSB/EVSB (vestigial side band/enhanced vestigial side band) signal.

The demultiplexer 804 is operative in demultiplexing the signal modulated by the demodulator 803 into audio data, video data and PSI/PSIP table data.

Demultiplexing of the audio/video data is controlled by the channel manager 809. And, demultiplexing of the PSI/PSIP table data is controlled by the. PSI/PSIP decoder 808.

The demultiplexed PSI/PSIP table is transferred to the PSI/PSIP decoder 808. The demultiplexed audio/video data is transferred to the A/V decoder 805. And, the A/V decoder 805 decodes the received data.

The PSI/PSIP decoder 808 parses a PSI/PSIP section. The PSI/PSIP decoder 808 reads the rest of actual section data failing in section filtering of the demultiplexer 804 and then records the read data in the PSI/PSIP database 807.

The PSI/PSIP decoder 808 can parse EAT information included in the PSI/PSIP while parsing the PSI/PSIP section. In this case, according to the parsed information, the application & UI manager 811 controls the display unit 806 to output a text associated with an emergency.

The display unit 806 outputs audio or video data and outputs an OSD (on screen display) video.

Yet, while the text associated with the emergency is outputted via the display unit 806, brightness, color and the like of the text are adjusted using an "alert_priority" field value among information included in the EAT 9 emergency alert table).

For instance, if the "alert_priority" field value is 8 shown in FIG. 2, it is controlled to output the text having a relatively small character size as shown in FIG. 9A. If the "alert_priority" field value is 15 shown in FIG. 2, it means a very significant emergency. Hence, it is controlled to output the text having a relatively large character size as shown in FIG. 9B.

For another instance, if the "alert_priority" field value is 8 shown in FIG. 2, it is controlled to output the text configured with characters of relatively thin brightness as shown in FIG. 10A. If the "alert_priority" field value is 15 shown in. FIG. 2, it means a very significant emergency. Hence, it is controlled to output the text configured with characters of relatively thick brightness as shown in FIG. 10B.

And, the channel manager 809 controls the tuner 802 to forcibly tune a channel to an emergency channel according to "alert_priority" (priority of an emergency). As mentioned in the foregoing description, the emergency channel can correspond to a conventional terrestrial broadcast channel or can be additionally set to a special frequency channel made to operate in case of an emergency only.

Meanwhile, terminologies used in the description of the present invention are defined as considering functions in the present invention, which are variable according to usual practice or intentions of those who skilled in the art. Hence, their definitions shall be given based on the overall contents of the present invention.

Accordingly, the present invention provides the following effects.

First of all, news associated with an emergency can be delivered to viewers of all terrestrial broadcasting associated with the emergency not by using all terrestrial broadcast channels to deliver the news but by utilizing a specific frequency channel only. Hence, the present invention can efficiently use the terrestrial broadcast channels.

Secondly, the present invention enables other regular terrestrial broadcasts to be normally broadcast while providing the information of emergency to a viewer. Hence, a user can selectively watch a broadcast associated with an emergency and a regular broadcast.

Thirdly, despite the diversity of terrestrial broadcast channels watched by viewers, the present invention can quickly provide the news associated with an emergency to terrestrial broadcast viewers at the same time point.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing an emergency alert information in a digital broadcasting receiver, comprising the steps of:
   receiving the emergency alert message including alert priority data and further able to include a details channel information field regarding an emergency broadcast channel to which a current channel is to be compulsorily changed, emergency alert contents in text form, alert text rate and at least one additional parameter, wherein the value of the additional parameter is used to control the alert text scroll speed, when a state of emergency where the channel change to the emergency broadcast channel is required occurs and further the alert priority data identifies types of processing the emergency alert message, and further wherein the emergency alert message is a test message not to be displayed if the value of the alert priority data corresponds to a first level; and
   processing the received emergency alert message based on a value of the alert priority data, wherein the processing step further comprises:
   discarding the received emergency alert message if the value of the alert priority data corresponds to a first level;
   displaying the emergency alert contents in text form included in the received emergency alert message at a controlled scroll speed in accordance with the additional parameter if the value of the alert priority data corresponds to a second level or a third level; and
   if the value of the alert priority data corresponds to the third level, additionally parsing the details channel information field included with the received emergency alert message to find the emergency broadcast channel and changing a current channel to the emergency broadcast channel.

2. The method of claim 1, wherein the changing step further comprising:
   identifying the value of alert priority data in the emergency alert message, wherein each of the first, second and third level corresponds to a low level, a middle level and a high level; and
   changing the current channel to the parsed details channel informationonly if identified that the value corresponds to the high level.

3. The method of claim 1, wherein the at least one additional parameter is alert text length.

4. The method of claim 1, wherein the at least one additional parameter defines an amount of time remaining to scroll the alert text across the video screen.

5. A digital broadcasting receiver comprising:
   a tuner arranged to receive an emergency alert message including alert priority data and further able to include a details channel information field regarding an emergency broadcast channel to which a current channel is to be compulsorily changed, emergency alert contents in text form, alert text rate and at least one additional parameter, wherein the value of the additional parameter is used to control the alert text scroll speed, when a state of emergency where the channel change to the emergency broadcast channel is required occurs and, wherein the alert priority data identifies types of processing the emergency alert message, and further wherein the emergency alert message is a test message not to be displayed if the value of the alert priority data corresponds to a first level; and
   a demodulator arranged to demodulate the emergency alert message;
   a demultiplexer arranged to demultiplex the emergency alert message;
   a decoder arranged to parse details channel information in the emergency alert message; and
   a controller arranged to process the emergency alert message based on the priority data, the controller further discards the received emergency alert message if a value of the alert priority data corresponds to a first level, displays the emergency alert contents in text form included in the received emergency alert message at a controlled scroll speed in accordance with the additional parameter if the value of the alert priority data corresponds to a second level or a third level, and if the value of the alert priority data corresponds to the third level, additionally parses the details channel information in the received emergency alert message to find the emergency broadcast channel and changes a current channel to the emergency broadcast channel.

6. The digital broadcasting receiver of claim 5, wherein the controller further identifies the value of alert priority data in the emergency alert message, wherein each of the first, second and third level corresponds to a low level, a middle level and a high level, and changes the current channel to the parsed details channel information only if identified that the value corresponds to the high level.

7. The receiver of claim 5, wherein the at least one additional parameter is alert text length.

8. The receiver of claim 5, wherein the at least one additional parameter defines an amount of time remaining to scroll the alert text across the video screen.

* * * * *